June 13, 1972 SUSUMU OKUYAMA 3,669,539
MICROFILM CAMERA

Filed July 9, 1970 2 Sheets-Sheet 1

United States Patent Office 3,669,539
Patented June 13, 1972

3,669,539
MICROFILM CAMERA
Susumu Okuyama, Tokyo, Japan, assignor to Kabushiki Kaisha Ricoh, Tokyo, Japan
Continuation-in-part of application Ser. No. 33,177, May 8, 1970, which is a continuation of application Ser. No. 769,990, Oct. 23, 1968. This application July 9, 1970, Ser. No. 53,494
Claims priority, application Japan, Oct. 28, 1967, 42/69,251, 42/69,252
Int. Cl. G03b 27/58
U.S. Cl. 355—64
9 Claims

ABSTRACT OF THE DISCLOSURE

A microfilm copying camera has a fixed horizontal base adapted to receive an object to be photographed and a lens movable vertically along a fixed optical axis. A camera body is located above the lens with means provided for moving the body horizontally transversely of the optical axis. Means are provided for advancing roll film in a film plane above an aperture in line with the optical axis. The aperture is defined on one side by a frame edge fixed with respect to the camera body and on the other side by a movable masking edge which moves in a direction opposite to that of the camera body relative to the optical axis whereby the size of the aperture may be changed without moving the center of the aperture away from the optical axis. A variable film advance is provided to move the film a distance corresponding to the size of the aperture. As an aid to the selection of the proper aperture means are provided for projecting through the lens prior to the operation of photographing a rectangle of light delineating the area which will be imaged on the film.

CROSS REFERENCE TO RELATED APPLICATIONS

This application is a continuation-in-part of an application 33,177, filed on or about May 8, 1970, now abandoned, the latter application in turn being a streamlined continuation of application Ser. No. 769,990, filed Oct. 23, 1968.

BACKGROUND OF THE INVENTION

The present invention relates to cameras which are adapted to record a reduced image of a document on film. Such cameras will be referred to hereafter as "microfilm cameras." Such a camera may be provided with a horizontal table adapted to receive a document to be copied and perhaps with illumination sources for lighting the surface of the document. The camera proper is supported upon a vertical post along which it slides so that the distance between the camera and the document being photographed may be varied, and consequently, the image of the document made to fill a desired frame size on the film, irrespective of the size of the document.

Microfilm cameras of the type involved in this invention use a long strip of film of constant width. Successive images are projected onto the film for recording at spaced distances along its length. It is obviously desirable in many cases to fill the film as fully as possible with images of documents, rather than with blank areas between successive images or at the sides of an image. In other words, it is desirable to fill the film as fully as possible in a widthwise direction and to have successive images follow each other on the film with either no gap between them or with a small, standardized gap. Achieving such results where documents of different sizes and shapes are recorded requires certain adjustable features within the camera, and it is to these adjustable features that this invention is directed.

The first feature that is required to achieve maximum utilization of the film is a mechanism which makes it possible to project the image of a document out to the sides of the film. This may be achieved by supporting the camera in a movable relationship upon the post mentioned above so that it may be raised until the image of the document extends as close as is desired to the film edges. The next necessity is a means of adjusting a framing member so that the image of the document will be fully projected upon the film in the length-wise direction of said film. Where two documents of equal width but different lengths are to be copied, the same camera height would be employed for both in order to fill the film in the transverse direction, but different segments of film would be required to record the full length of the documents without wasting film.

Finally, in the desired camera structure means must be provided to insure that the film is advanced only far enough to allow each image to be recorded without overlapping a neighboring image.

Microfilm cameras which are vertically adjustable toward and away from a document are well known. Such cameras have been proposed in which framing members are adjustable in order to define the size of the image cast upon a film in accordance with the dimensions of the document being copied. In one such construction a pair of masks are employed which are movable toward and away from the optical axis of the camera in a position adjacent the film plane so as to vary the longitudinal dimensions of the projected image. In a second structure a single mask is displaced from one side of the optical axis in order to vary the size of the image. In the former construction, the use of two masks renders the structure complex. The latter structure is relatively simple but has a defect in that the center of the picture frame is not usually coincident with the optical axis of the photographic lens of the camera.

It is desirable in a microfilm camera that there be means to apprise the operator of the area of the document which will be registered upon the film.

SUMMARY OF THE INVENTION

The invention comprises a microfilm camera having the usual horizontal table upon which a document may be placed for copying and having a vertical post for supporting the camera. A vertically slidable support on the post makes it possible to adjust the vertical position of the camera in order to fill the film from side to side with a desired image. The photographing lens of the camera may be moved only in a vertical direction along a fixed optical axis. The camera body, however, is not only movable vertically in conjunction with the photographing lens, but is movable horizontally in the direction in which the film travels. The camera body includes not only the film and its associated advancing mechanism, but masking elements which define the extent of the image cast upon the film in a longitudinal direction thereof. Means are provided so that the operator can manually adjust the lateral position of the camera body. Such adjustment moves one of the masking elements which is integral with the camera body in a direction longitudinal of the film strip. It also causes one pinion in a pair of unitary pinions to roll along a fixed rack. This rolling motion rotates both pinions and advances a sliding rack in a direction opposite to the motion of the camera body. The sliding rack controls the position of a second masking element which thereby defines the other edge of the image cast upon the film. Motion of the camera body as described above also adjusts a blocking cam which modifies the action of a reciprocal pawl. The reciprocable pawl is reciprocated once during each picture-taking cycle and engages a ratchet wheel which advances the film over the picture taking aperture defined by the various masking elements mentioned above. By regulating the portion of its stroke over which the pawl engages the ratchet wheel, the blocking cam regulates the amount of film which is advanced for any one picture-taking cycle.

The invention is also equipped with an internal projector which projects upon the document to be copied a grid of lines which enables the operator to properly center the document and to recognize the document area which will be photographed. The projecting means mentioned is not laterally movable relative to the optical axis of the camera. In order that the adjustments of the camera body which have been mentioned above will effect similar adjustments in the projected grid image upon the document, it is necessary that the masking elements mentioned above also mask the image projected thereon. Means are provided whereby the masking elements do modify the projected grid image which falls upon the document.

With the invention, the operator need only raise the camera until the projected grid image which he sees upon the document extends laterally to the extent he desires. He need then only adjust the lateral position of the camera body in order that the projected grid image extend longitudinally of the document to the extent he desires. The latter adjustment will set the film advance mechanism to advance just sufficient film to record the document without wasting any film, and will also insure proper masking of the film during the picture-taking step.

The invention described so far is adapted to photographing documents of any size and shape and to filling the film completely with their images. However, if documents of a standard size are to be copied a provision is made for manually adjusting the film advance mechanism so that a constant length of film is advanced during each photographing cycle.

BRIEF DESCRIPTION OF THE DRAWING

As seen in FIG. 1, a camera body 1 is mounted upon a support 2 for horizontal movement with respect thereto. The support 2 is vertically movable along a vertical post 3. As shown in FIG. 3 the camera body 1 is divided into a film chamber 1a and a mechanism chamber 1b by a partition plate 4.

In the film chamber 1a there are disposed a film winding and rewinding mechanism and masking elements for defining an exposure aperture through which the film is exposed to light projected by the photographing lens. In the mechanism chamber 1b are disposed a mechanism for advancing the film a desired distance and for controlling the framing members which define the size of the image recorded upon the film and also framing members which define the size of a grid-work which is projected upon the document as an aid to alignment prior to the picture taking step.

Figure 1:
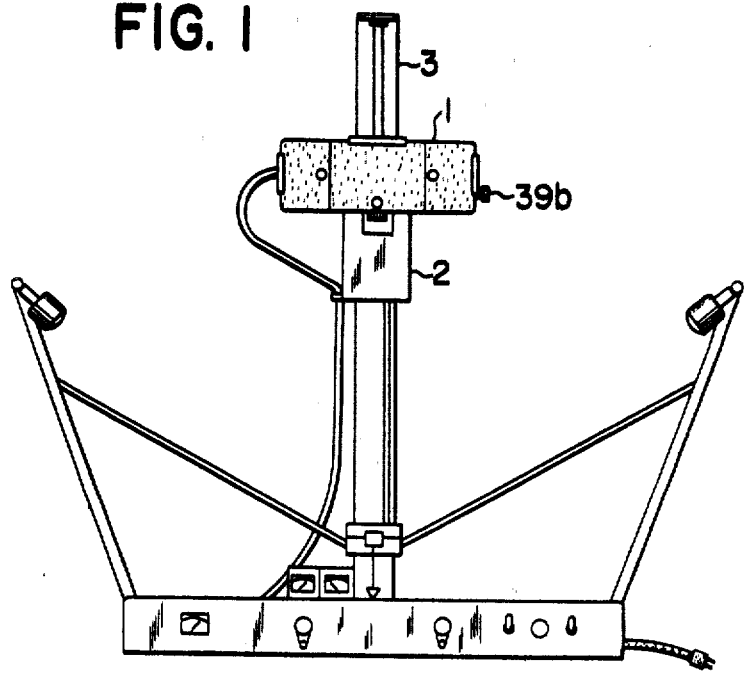
FIG. 1 is a front view of a microfilm camera and stand which embodies the present invention.
Figure 2:
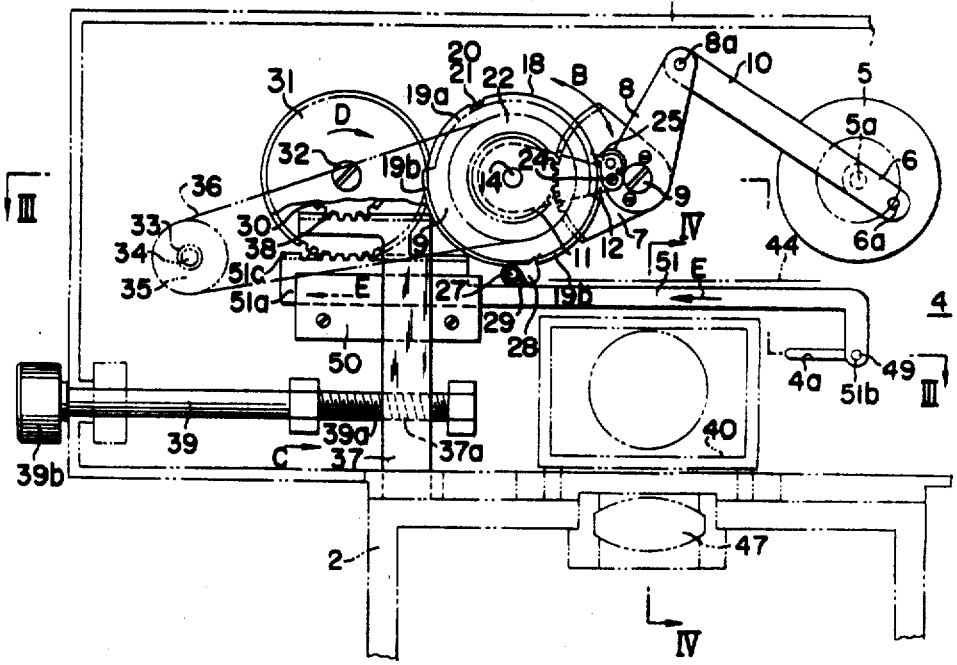
FIG. 2 is an enlarged partial rear view of the camera body of FIG. 1 with portions of the casing removed in order to illustrate the essential parts.

As may best be seen in FIG. 2, a crank lever 6 is disposed behind a connecting rod 10, said crank lever having its inner end coupled to a rotatable shaft 5a of a motor 5 which is mounted on the base plate 4 within the mechanism chamber 1b. The crank lever 6 is coupled to connecting rod 10 at one end thereof through a connecting pin 6a. The other end of the connecting rod 10 is connected through a connecting pin 8a to a crank lever 8 which, in turn, is securely fixed to a gear sector 7 rotatably carried by shaft 9. Rotation of motor shaft 5a through a 360 degree angle causes the gear sector 7 to reciprocate, motion being transmitted through the crank 6, the connecting rod 10, and the crank arm 8.

Figure 3:
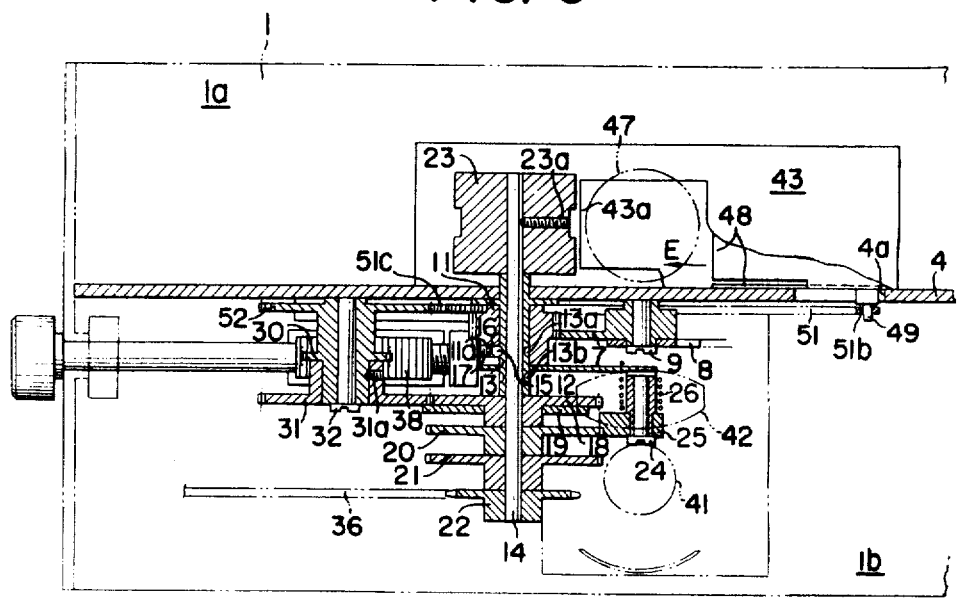
FIG. 3 is a partial sectional view taken along the cutting plane III—III of FIG. 2.

As may best be seen in FIG. 3, a sliding gear 11 is rotatably mounted upon and slidable along a fixed bearing 13 which projects from the base plate 4. A lever 12 is made integral with gear 11. The gear sector 7 meshes with the teeth of sliding gear 11. As may be noted from FIG. 3, the latter teeth are sufficiently wide so that said meshing occurs whatever the longitudinal position of sliding gear 11 along bearing 13.

A film-advance shaft 14 is rotatably fitted into the bearing 13 and extends through the partition plate 4 from the mechanism chamber 1b to the film chamber 1a. Annular grooves 13a and 13b are formed in the peripheral surface of the bearing 13. The gear 11 is provided with a detent mechanism in the form of a ball 15 which is movable within a through bore 11a and is pressed against the bearing 13 by a spring 16 which in turn is retained in place by a screw 17. By means of the detent mechanism the gear 11 may be retained in either of two axial positions with respect to the bearing 13. As shown in FIG. 3 the gear 11 is in the retracted position in which it is as close as possible to the partition plate 4. In this retracted position ball 15 engages annular groove 13a. Gear 11 may also be moved axially into an advanced position in which ball 15 engages annular groove 13b.

A cam gear 18 is integral with a cam 19 which is adapted to control the feeding of the film as will be described below. Cam gear 18 is mounted upon a film-advance shaft 14, but is rotatable independently thereof. Cam 19 is provided with a depressed cam surface 19a and a raised cam surface 19b which are so formed that the depressed cam surface 19a does not extend beyond the periphery of a first ratchet wheel 20 while the raised cam surface 19b does so extend.

First and second ratchet wheels 20 and 21 are coaxially mounted upon film-advance shaft 14 and are rotatable therewith. A sprocket, which is adapted to mesh in driving relationship with a chain, is also mounted upon film-advance shaft 14 and rotates therewith. On the opposite end of the film-advance shaft within the film chamber there is fixed a film-advancing wheel 23 held in place by a set screw 23a.

An advancing pawl 25 is rotatably mounted upon a pin 24 which is in turn fixed to the outer end of lever 12. Depending upon the axial position of sliding gear 11, the advancing pawl 25 either engages the first ratchet wheel 20 and the cam 19 or the second ratchet wheel 21 under the urging of a spring 26. The width of the advancing pawl 25 is sufficient to enable it to simultaneously engage either the ratchet wheel 20 and the cam 19 (when in the retracted position shown in FIG. 3) or both the first and second ratchet wheels 20 and 21 when it is in the advance position. A retaining pawl 28 is rotatably mounted upon a pin 27 which extends from the partition plate 4. The retaining pawl engages the periphery of the second ratchet wheel 21 under the urging of a spring 29 so as to prevent the rotation of the film-advance shaft 14 and its associated ratchet wheels in a reverse direction (clockwise in FIG. 2).

A first pinion gear 30 and a second gear 31 which are united by a set screw 31a are rotatably carried by a pin 32 which, in turn, is securely fixed to the base plate 4. The second gear 31 is in mesh with the cam gear 18. As may be seen in FIG. 2 a film take-up shaft 34 is journaled by a bearing 33 which is securely fixed to the base plate 4. A sprocket 35 is fixed to the film take-up shaft 34. A drive chain 36 extends from the sprocket 35 to sprocket 22 on the film-advance shaft 14. A film winding spool (not shown) is fitted over an end of the film take-up shaft 34 which extends into the film chamber 1a and is connected thereto through a friction clutch which allows slippage. The friction clutch is not shown.

As may best be seen in FIG. 2 a guide arm 37 is provided which is integrally formed with the support 2. A tapped hole 37a is formed in the guide arm and receives an externally threaded segment 39a. The feed screw shaft 39 is journaled in bearings supported by the partition plate 4 and does not move axially relative to said partition plate. It is, however, rotatable relative to the partition plate. An externally located knob 39b is integral with the feed screw shaft 39. Rotation of knob 39b moves the camera body 1 relative to the support 2 in a horizontal direction.

A first rack 38 extends in a horizontal position from the upper extremity of the guide arm 37 and is in mesh with the teeth of first pinion gear 30. A guide plate 50 is fastened to the partition plate 4 and serves to support a sliding plate 51a and to allow horizontal motion of said sliding plate. A second rack 51c is located on the upper edge of the sliding plate and meshes with the teeth of second pinion gear 52. Second pinion gear 52 is integral with the first pinion gear 30 described above. A push rod 51 is integral with the sliding plate 51a and moves therewith in a horizontal direction. The push rod extends horizontally to the right as seen in FIG. 2 and has a depending end portion which terminates in a hole 51b which carries a guide pin 49. The guide pin 49 extends through an elongated horizontal slot 4a in base plate 4. The purpose of the guide pin will be described below.

Figure 4:
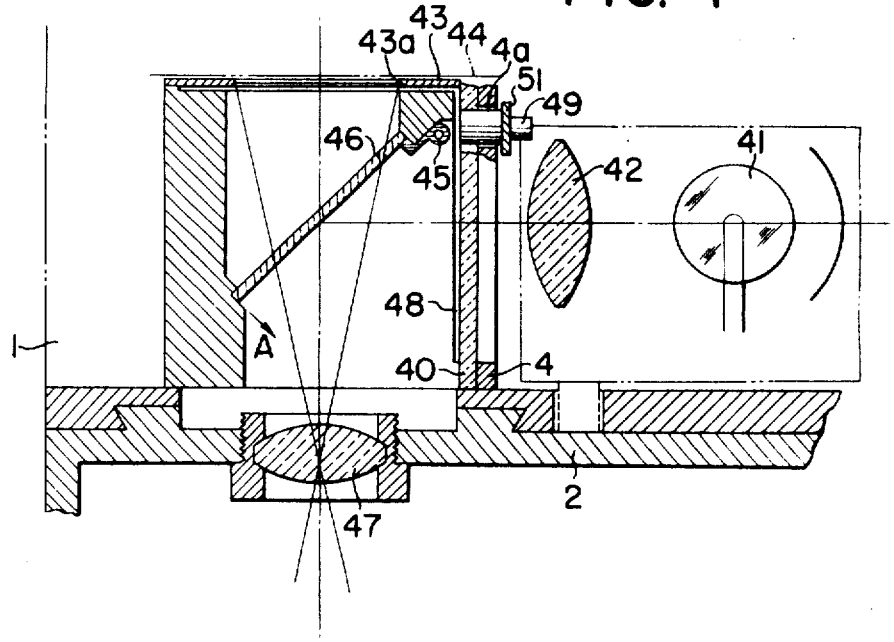
FIG. 4 is a partial sectional view to an enlarged scale taken along the cutting plane IV—IV of FIG. 2.

As shown in FIGS. 2 and 4, a chart plate 40 is disposed in the film chamber 1a parallel with and in contact with the base plate 4. The chart plate 40 covers an aperture cut through the partition plate 4. Outside said aperture, and behind the partition plate 4, there is disposed a light source 41 and a condenser lens 42. The chart plate 40 is provided so that the operator may know precisely what area on the document being photographed will be projected upon the film. The chart plate 40 is of a transparent material, such as glass, and has grid marks thereon. A film guide plate 43 is disposed horizontally at right angles relative to the film chart plate 40 and defines an exposure aperture 43a which masks the film during picture taking. A mirror 46 is rotatably carried by a shaft 45 and is normally held as shown in FIG. 4 at a 45 degree angle relative to the surface of the chart plate 40 and the film plane 44, so that the film plane 44 may be shielded from the light emanating from the light source 41. Mirror 46 reflects rays from the chart plate downward and thereby projects an image of the chart plate upon the object to be photographed through a lens 47 which is supported by support 2. During the actual photography step, the mirror 47 is rotated in the direction indicated by the arrow A and the light source 41 is extinguished. Rotation of the mirror in this manner opens the optical path for the projection of an image of the document upon a film in film plane 44.

A slidable mask 48 has an L-shaped cross section as seen in FIG. 4. The mask (which is supported for horizontal motion by guides which are not shown) is movable horizontally under the influence of guide pin 49 which engages therewith through the partition plate 4. The mask 48 which is movable below the film guide plate 43 serves to occlude part of the aperture through said film guide plate when said mask is moved to the left as shown in FIG. 3. When so moved, it forms the right hand edge of the rectangular aperture which is otherwise defined by the film guide plate and cooperates with the film guide plate to delineate a rectangular exposure aperture for framing the image which reaches the film.

Within the mechanism chamber 1b there is disposed a mechanism which coacts with a cam fixed to the rotary shaft 5a of the motor 5 for moving a pressure plate away from the film during its advance and for holding the film upon the pressure plate under the influence of suction pressure created by a vacuum pump and other mechanisms for retracting the reflecting mirror 46 so as to expose the film. Within the film chamber 1a there are disposed a means for storing unexposed film, for winding said film, and a number of guide rollers for directing its course. These mechanisms and means do not constitute the present invention and they will not be described further in this specification.

Next the mode of operation of the device will be described. Prior to the commencement of photographing, a film is loaded through the various guide rollers and looped over the film-advancing wheel 23. It is then secured to a spool on the film takeup shaft 34. After the camera has been loaded as described, gear 11 is manually adjusted to the position shown in FIG. 3 wherein the detent means engages the annular groove 13a. A document having been placed in line with the optical axis on the base, the light source 41 is turned on and the image of the chart plate 40 is projected through the photographing lens 47 onto the document. If necessary, the support 2 with the camera 1 is adjusted vertically so that the image of the chart plate extends as far to the sides of the document as the operator desires. The support then having been locked in place, the operator next adjusts the longitudinal extent of the image to be recorded by turning knob 39b.

If it be assumed that the operator wishes to shorten the longitudinal extent of the image projected upon the film he will rotate the knob 39b in such a direction as to move the camera body 1 to the right as seen in FIG. 2 relative to the support 2. Since the first rack 38 is immovable during this operation, the first pinion gear 30 will roll over said rack and rotate in the direction D so that the second pinion gear 52 also rotates in the direction D. Since second pinion gear 52 is in mesh with second rack 51c said second rack will be driven to the left as seen in FIG. 2 relative to the camera body 1. Further, since the radius of the pitch circle of the gear teeth of first pinion gear 30 is one-half that of the pitch circle of the gear teeth of second pinion gear 52, the result will be that sliding plate 51a will move a distance to the left as seen in FIG. 2 which is equal to the distance which the camera body 1 moves to the right. For example, if the camera body is moved one-half inch to the right as seen in FIG. 2 relative to the fixed support 2, the sliding plate 51a will move one-half inch to the left as seen in FIG. 2 relative to the fixed support 2. Motion of the sliding plate is indicated by the arrow E shown in FIG. 2. Since the mask 48 is connected to the sliding plate 51a it too will move to the left in FIG. 2. Thus the aperture 43a defines three sides of a rectangular opening and the mask plate 48 the fourth side, said opening exposing a rectangular portion of the film for the reception of an image projected by the lens 47. Since the aperture in the partition plate 4 cooperates with the vertical portion of the mask 48 to define a rectangular opening across which is positioned the chart plate 40, adjustment of the mask also adjusts the shape of the image of the chart plate 40 which is cast upon the document. The operator is thereby shown the true size of the area which will be photographed during the photographing step.

The above description explains how the aperture is controlled and the camera position relative to the document so that the desired area of the document is eventually photographed. As has been explained above it is also necessary to regulate the film feed in order to avoid the waste of film attendant upon undesirably large gaps between successive images. The mechanism for such regulation will now be described. Rotation of the second pinion gear 52 brings about rotation of the second gear 31 (see FIG. 3) with which it is united. Rotation of the second gear rotates cam gear 18 with which it is in mesh and therefore also rotates cam 19. In the example given above in which the camera body is moved to the right as seen in FIG. 2 the result of such movement as transmitted through the gears just mentioned is to rotate the cam 19 in a counterclockwise direction. Such rotation brings the raised cam surface 19b into contact with the advancing pawl 25 and lifts said advancing pawl away from contact with the teeth of the first ratchet wheel 20. When motor 5 is activated for a film-advanced cycle, it makes one full revolution and then stops. This movement rocks crank arm 8 from the position shown in FIG. 2, first in a counterclockwise direction and then in a clockwise direction. The motion of the crank arm is transmitted to the gear sector 7 and through said gear sector to sliding gear 11. Sliding gear 11 therefore oscillates first in a clockwise direction and then in a counterclockwise direction carrying with it lever 12 and the advancing pawl 25. During clockwise motion of the advancing pawl its tooth rides over the teeth of the first ratchet wheel 20 and, when it reaches the raised cam surface 19b, over said surface. Upon the counterclockwise return stroke the tooth first does not engage the first ratchet wheel 20 because it is held out of contact therewith by the raised cam surface 19b. Having passed said raised cam surface, however, the advancing pawl is able to engage the first ratchet wheel 20 and rotate it together with film-advance shaft 14 in a counterclockwise direction.

Since rotation of the film-advance shaft 14 determines the amount of film which is advanced during one cycle of the motor 5, it will be realized that readjustment of the angular position of the cam 19 as described above will also readjust the amount of film advanced. In the example given above in which the camera body was moved to the right as shown in FIG. 2 it will be seen that the motion of the cam 19 in a counterclockwise direction during the adjustment of the camera body will tend to reduce the angle through which shaft 14 is rotated because the raised cam surface 19b will maintain the advancing pawl 25 out of engagement with the first ratchet wheel 20 during a greater fraction of the reciprocating stroke of said advancing pawl. This is consistent with the fact that the motion described above reduces the size of the aperture through which the film is exposed and therefore reduces the length of film which is required to be advanced. The relationship among the gears 30, 31, 18, 52, etc. is so selected that the feed of the film is controlled in response to the size of the aperture which determines the size of the image thrown upon the film.

Since rotation of film-advance shaft 14 also rotates sprocket 22 and (through drive chain 36) sprocket 35, it serves also to wind onto the film take-up spool a suitable length of exposed film.

By using closely set ratchet teeth on the first ratchet wheel 20, it is possible to have quite fine adjustment of the amount of film advanced. In those cases where it is desired to advance the film a pre-determined distance, it is only necessary manually to move the sliding gear 11 to the advanced position in which the detent means engages annular groove 13b. With the sliding gear 11 in the advance position just described, the advancing pawl 25 is moved from the position shown in FIG. 3 to a position in which it engages the second ratchet wheel 21, but not the cam 19. Reciprocation of the advancing pawl 25 in this position will rotate film-advanced shaft 14 through the maximum angle traveled by the advancing pawl.

I claim:

1. A microfilming camera comprising:
support means for supporting a photographing lens and a camera body;
means for sliding the camera body relative to the photographing lens in a direction transverse to the optical axis of the photographing lens;
means movable with the camera body for defining a transverse edge of an exposure aperture through which light may reach a film in the camera body;
means for displacing a mask within the camera body, said mask defining a second transverse edge of the exposure aperture, said means displacing said mask a distance equal and opposite to that moved by the camera body during sliding thereof;
means for determining a length of film to be advanced in response to the displacement of the mask;
the center of the exposure aperture remaining coincident with the optical axis of the photographing lens during motion of the camera body; and
said means for sliding said camera body comprises a feed screw screwed into an internally threaded hole formed into a member fixed securely to said supporting means in such a manner that said feed screw may be rotatable relative to said camera body but may not be displaced in the axial direction relative to said camera body.

2. A microfilming camera comprising:
support means for supporting a photographing lens and a camera body;
means for sliding the camera body relative to the photographing lens in a direction transverse to the optical axis of the photographing lens;
means movable with the camera body for defining a transverse edge of an exposure aperture through which light may reach a film in the camera body;
means for displacing a mask within the camera body, said mask defining a second transverse edge of the exposure aperture, said means displacing said mask a distance equal and opposite to that moved by the camera body during sliding thereof;
means for determining a length of film to be advanced in response to the displacement of the mask;
the center of the exposure aperture remaining coincident with the optical axis of the photographing lens during motion of the camera body;
said means for determining a length of the film to be advanced comprises
a cam having raised and depressed cam surfaces,
means for rotating said cam through a predetermined angle,
at least one ratchet wheel,
a pawl which moves away from said ratchet wheel when the free end of said pawl engages with said higher cam surface of said cam and which engages with said ratchet wheel when said free end of said pawl engages with said lower cam surface of said cam, and
means for driving said pawl.

3. A camera comprising:
a camera body having a film plane;
a lens having an optical axis adapted to form an image of an object in the film plane;
first shifting means for moving the camera body relative to the lens in a direction perpendicular to the optical axis of said lens;
first masking means located between the lens and the film plane and fixed with respect to the camera body for defining a first side of an exposure aperture, said exposure aperture shielding portions of the film plane from light passing through the lens into the camera body and thereby defining the area of a film in the film plane which will receive such light during an exposure operation;
second masking means located between the lens and the film plane and movable with respect to the camera body for defining a second side of the exposure aperture opposed to the first side thereof and equidistant from the optical axis;
second shifting means for moving the second masking means relative to the lens in a direction opposite to the direction of movement of the camera body caused by the first shifting means and a distance equal to the distance so moved by the camera body whereby the first and second sides of the exposure aperture remain equidistant from the optical axis at all times.

4. The camera of claim 3 comprising means for advancing a film strip through the film plane during a film-advancing step prior to an exposure, said means advancing said film strip a distance dependent upon the separation between the first and second masking means during the film-advancing step, an incremental change in the latter distance producing a corresponding incremental change in the former of equal extent.

5. The camera of claim 3 wherein:

the second masking means comprises a movable plate having an edge which defines the second side of the exposure aperture; and the second shifting means comprises a first rack fixed with respect to the lens and extending parallel to the direction of motion of the camera body in response to the action of the first shifting means;

a first pinion gear meshed with the first rack and rotatable about an axis fixed with respect to the camera body;

a second pinion gear coaxially mounted with respect to the first pinion gear and rotatable therewith, said second pinion gear having a pitch diameter twice that of the first pinion gear;

a second rack meshed with the second pinion gear and extending parallel to the first rack; and means connecting the second masking means to the second rack for movement therewith.

6. The camera of claim 5 comprising means for advancing a film strip through the film plane during a film-advancing step prior to an exposure, said means comprising:

a film-advance shaft;

means for engaging and advancing the film a distance proportional to the angular rotation of the film-advance shaft;

a second gear coaxially mounted with respect to the first pinion gear and rotatable therewith;

a cam gear mounted coaxially with the film-advance shaft and rotatable independently of said film-advance shaft;

a first ratchet wheel mounted coaxially with the film-advance shaft and rotatable therewith;

a reciprocable pawl-bearing arm mounted for rotation about the axis of the film-advance shaft in a forward and a return stroke during a film-advancing cycle;

an advancing pawl mounted on the pawl-bearing arm and reciprocable therewith, said advancing pawl being engageable with the first ratchet wheel for advancing said first ratchet wheel in response to reciprocation of the pawl-bearing arm;

a cam coaxial with the cam gear and rotatable therewith, said cam having pawl-engaging cam surface around part of its periphery, said pawl-engaging cam surface blocking engagement of the advancing pawl with the first ratchet wheel during an angular fraction of the reciprocating motion of the advancing pawl, said angular fraction being variable in response to variations in the position of the cam whereby said cam controls the extent of the rotation of the film-advance shaft.

7. The camera of claim 6 wherein the reciprocation of the pawl-bearing arm is effected by an oscillating sector gear oscillated by a motor-driven crank mechanism meshing with a gear attached to the pawl-bearing arm and mounted coaxially therewith.

8. The camera of claim 3 comprising indicating means for projecting upon an object to be photographed an image coincident in outline with the portions of said object to be photographed.

9. The camera of claim 8 wherein the indicating means comprises:

a light source;

a means for projecting through the lens an image of an indicating aperture illuminated by said light source; and means for varying the size of the indicating aperture in proportion to the variation in size of the exposure aperture.

References Cited
UNITED STATES PATENTS

| | | | |
|---|---|---|---|
| 2,415,424 | 2/1947 | Gaebel | 355—64 X |
| 2,748,651 | 6/1956 | Simijian | 355—64 |
| 2,496,329 | 2/1950 | Briechle et al. | 355—64 |

SAMUEL S. MATTHEWS, Primary Examiner

R. L. MOSES, Assistant Examiner

U.S. Cl. X.R.

95—86